United States Patent

Suzuki et al.

[11] Patent Number: 5,903,843
[45] Date of Patent: May 11, 1999

[54] TRAFFIC CHANNEL ASSIGNMENT BASED ON TRAFFIC DENSITY AND SIGNAL QUALITY

[75] Inventors: Hideya Suzuki, Hachioji; Arata Nakagoshi, Tokyo; Masahiro Koya, Kodaira; Noriyuki Sugiura, Yokohama, all of Japan

[73] Assignee: Hitachi, Ltd., Tokyo, Japan

[21] Appl. No.: 08/500,751

[22] Filed: Jul. 11, 1995

[30] Foreign Application Priority Data

Jul. 11, 1994 [JP] Japan ................................. 6-158374

[51] Int. Cl.$^6$ ..................................................... H04Q 7/20
[52] U.S. Cl. ........................... 455/452; 455/453; 455/525; 455/561
[58] Field of Search .................................. 455/33.1, 33.2, 455/34.1, 34.2, 54.1, 54.2, 56.1, 62, 422, 436, 438, 439, 450, 451, 452, 453, 517, 524, 525, 561; 379/58, 60

[56] References Cited

U.S. PATENT DOCUMENTS 5,257,402 10/1993 Crislev .................................. 379/60 X
5,448,761 9/1995 Ushirokawa .............................. 455/62
5,519,884 5/1996 Duque-Arton et al. ........... 455/56.1 X
5,561,847 10/1996 Kataoka ................................ 455/62 X

OTHER PUBLICATIONS

IEICE Japan National Spring Conference (1989) B–860.

Primary Examiner—Wellington Chin
Assistant Examiner—Philip J. Sobutka
Attorney, Agent, or Firm—Antonelli, Terry, Stout & Kraus, LLP

[57] ABSTRACT

A radio communication system and a traffic channel assignment method for realizing the assignment of traffic channels capable of improving the efficiency of use of frequency in the case where the traffic density is high and improving a radio link quality in the case where the traffic density is low. A base station judges the traffic density from a carrier to interference power ratio (CIR) on each channel capable of being selected as a traffic channel. In the case where the traffic density is low, a traffic channel assignment mode selecting an available channel having a greater CIR is assigned as a traffic channel to a mobile station. In the case where the traffic density is high, a traffic channel assignment mode selecting an available channel having a smaller CIR is assigned as a traffic channel to the mobile station. Thereby, it is possible to structure a radio communication system which can cope with the condition of the traffic density of the neighborhood.

28 Claims, 9 Drawing Sheets

| | BUSY FLAG | RECEIVED SIGNAL STRENGTH LEVEL | CIR | IDLE FLAG | PRIORITY |
|---|---|---|---|---|---|
| TRANSMITTED WAVE | ✕ | 70dBμ | ✕ | ✕ | ✕ |
| INTERFERENCE WAVE — CHANNEL 1 | 0 | 20dBμ | 50dB | 1 | |
| CHANNEL 2 | 1 | → | → | 0 | |
| CHANNEL 3 | 0 | 60dBμ | 10dB | 0 | |
| CHANNEL 4 | 0 | 10dBμ | 60dB | 1 | |
| CHANNEL 5 | 0 | 55dBμ | 15dB | 1 | |
| CHANNEL 6 | 0 | 30dBμ | 40dB | 1 | |

| | NUMBER |
|---|---|
| SELECTABLE CHANNEL | 6 |
| AVAILABLE CHANNEL | 4 |

| RATIO OF NUMBER OF AVAILABLE CHANNELS TO TOTAL NUMBER OF SELECTABLE CHANNELS | 0.67 |
|---|---|

FIG. 6A   FIG. 6B   FIG. 6C

▨ : CELL OF HIGH TRAFFIC DENSITY    ☐ : CELL OF LOW TRAFFIC DENSITY

|  |  | BUSY FLAG | RECEIVED SIGNAL STRENGTH LEVEL | CIR | IDLE FLAG | PRIORITY |
|---|---|---|---|---|---|---|
| TRANSMITTED WAVE | | ✕ | 70dBμ | ✕ | ✕ | ✕ |
| INTERFERENCE WAVE | CHANNEL 1 | 0 | 60dBμ | 10dB | 0 | 0 |
| | CHANNEL 2 | 1 | → | → | 0 | 0 |
| | CHANNEL 3 | 0 | 60dBμ | 10dB | 0 | 0 |
| | CHANNEL 4 | 0 | 10dBμ | 60dB | 1 | 195 |
| | CHANNEL 5 | 0 | 55dBμ | 15dB | 1 | 240 |
| | CHANNEL 6 | 0 | 60dBμ | 10dB | 0 | 0 |

|  | NUMBER |
|---|---|
| SELECTABLE CHANNEL | 6 |
| AVAILABLE CHANNEL | 2 |

| RATIO OF NUMBER OF AVAILABLE CHANNELS TO TOTAL NUMBER OF SELECTABLE CHANNELS | 0.33 |
|---|---|

|  |  | BUSY FLAG | RECEIVED SIGNAL STRENGTH LEVEL | CIR | IDLE FLAG | PRIORITY |
|---|---|---|---|---|---|---|
| TRANSMITTED WAVE | | ✕ | 70dB μ | ✕ | ✕ | ✕ |
| INTERFERENCE WAVE | CHANNEL 1 | 0 | 20dB μ | 50dB | 1 | 225 |
| | CHANNEL 2 | 1 | → | → | 0 | 0 |
| | CHANNEL 3 | 0 | 60dB μ | 10dB | 0 | 0 |
| | CHANNEL 4 | 0 | 10dB μ | 60dB | 1 | 235 |
| | CHANNEL 5 | 0 | 55dB μ | 15dB | 1 | 190 |
| | CHANNEL 6 | 0 | 30dB μ | 40dB | 1 | 215 |

|  | NUMBER |
|---|---|
| SELECTABLE CHANNEL | 6 |
| AVAILABLE CHANNEL | 4 |

| RATIO OF NUMBER OF AVAILABLE CHANNELS TO TOTAL NUMBER OF SELECTABLE CHANNELS | 0.67 |
|---|---|

▨ : CELLS USING SAME TRAFFIC CHANNEL

FIG. 16

TRAFFIC CHANNEL ASSIGNMENT BASED ON TRAFFIC DENSITY AND SIGNAL QUALITY

BACKGROUND OF THE INVENTION

The present invention relates to a radio communication system and a traffic channel assignment method.

One of radio communication systems requiring the assignment of traffic channels includes an analog cordless telephone system. In the conventional analog cordless telephone system, a base station makes a successive search of a plurality of channels having predetermined frequencies prior to the communication in a mobile station so that a channel having a received signal strength level equal to or smaller than a predetermined value is judged as being an available (or empty) channel. If an available channel is found out, it is assigned as a traffic channel.

The IEICE Japan National Spring Conference, B860, 1989 has proposed a traffic channel assignment method in which a base station calculates a carrier to interference power ratio (CIR) on each channel from the received signal strength level of interference wave at that channel and the received signal strength level of transmitted wave from a mobile station to judge a channel with CIR equal to or greater than a specified or predetermined threshold value as being an available channel in order to ensure the lowest communication quality at a radio communication system. In the case where there are a plurality of available channels, a channel having the smallest CIR is selected as a traffic channel.

However, in the traffic channel assignment method as in the conventional analog cordless telephone system in which any channel having a received signal strength level equal to or smaller than the predetermined value is immediately selected as a traffic channel if it is found out, a problem is involved in the effective use of channel frequency as the whole of a radio communication system.

On the other hand, in the traffic assignment method in which available channels are selected as traffic channels in order of smaller CIR, each base station operates so that the selection as a traffic channel is made giving priority to a channel with low communication quality at another base station relatively near to that base station rather than a channel with high communication quality at another base station far from that base station. As a result, there is a merit that the same frequency channel is commonly used by a large number of base stations placed at relatively short intervals and hence the efficiency of use of channel frequency as the whole of the radio communication system is improved. In the latter traffic channel assignment method, however, since available channels are selected or assigned as traffic channels in order of smaller CIR even in the case where the traffic density is low, there is a problem that the traffic channel encounters the interference of electric waves from other base stations and hence a satisfactory radio link quality cannot be obtained.

SUMMARY OF THE INVENTION

An object of the present invention is to provide a radio communication system in which a system scale is flexibly changeable.

Another object of the present invention is to provide a traffic channel assignment method in which the efficiency of use of channel frequency is increased in the case of a high traffic density to enable an increase in number of acceptable mobile stations in the whole of a radio communication system and a radio link quality can be improved in the case of a low traffic density.

To that end, in a radio communication system of the present invention, a base station has a plurality of traffic channel assignment modes for the assignment of traffic channels, selects one of the plurality of traffic channel assignment modes in accordance with the traffic density of the neighborhood of the base station, and selects a traffic channel to be assigned to a mobile station in accordance with the selected traffic channel assignment mode.

In the radio communication system and traffic channel assignment method of the present invention, the base station estimates the traffic density of the neighborhood of the base station from the ratio of the number of available channels to the total number of selectable channels to change the traffic channel assignment mode in accordance with the traffic density.

The selection of the traffic channel assignment mode adapted to the condition of the traffic density is made in such a manner that in the case where the traffic density is high, importance is attached to an increase in capacity of a radio link as the whole of the radio communication system inclusive of other neighboring base stations rather than a radio link quality, and in the case where the traffic density is low, importance is attached to the radio link quality rather than the capacity of the radio link.

For example, in the case where the traffic density is high, available channels having CIR equal to or greater than the predetermined threshold value capable of ensuring the specified lowest radio link quality are selected in order of smaller CIR so that the same channel can be shared by base stations placed at relatively short distance from each other. On the other hand, in the case where the traffic density is low, the available channels are selected in order of greater CIR to share the same channel by base stations placed at relatively long distance from each other so that the mobile station can obtain a traffic channel having a reduced interference and a high radio link quality.

According to the present invention, a base station changes a traffic channel assignment mode in accordance with the traffic density of the neighborhood so that an interval between base stations using the same channel frequency is controlled in accordance with the traffic density. Thereby, it is possible to cope with the control of the capacity of radio terminals and the improvement of a radio link as the whole of the communication system.

Also, in the traffic channel assignment method of the present invention, a base station can perform the assignment of a traffic channel without communicating with another base station or control station using control information necessary for traffic channel assignment. Therefore, it is possible to easily realize a change in system scale inclusive of the addition of a new base station and the dismantlement or movement of the existing base station after the start of operation of the radio communication system.

The foregoing and other objects, advantages, manner of operation and novel features of the present invention will be understood from the following detailed description when read in connection with the accompanying drawings.

DESCRIPTION OF THE PREFERRED EMBODIMENTS

Figure 1:
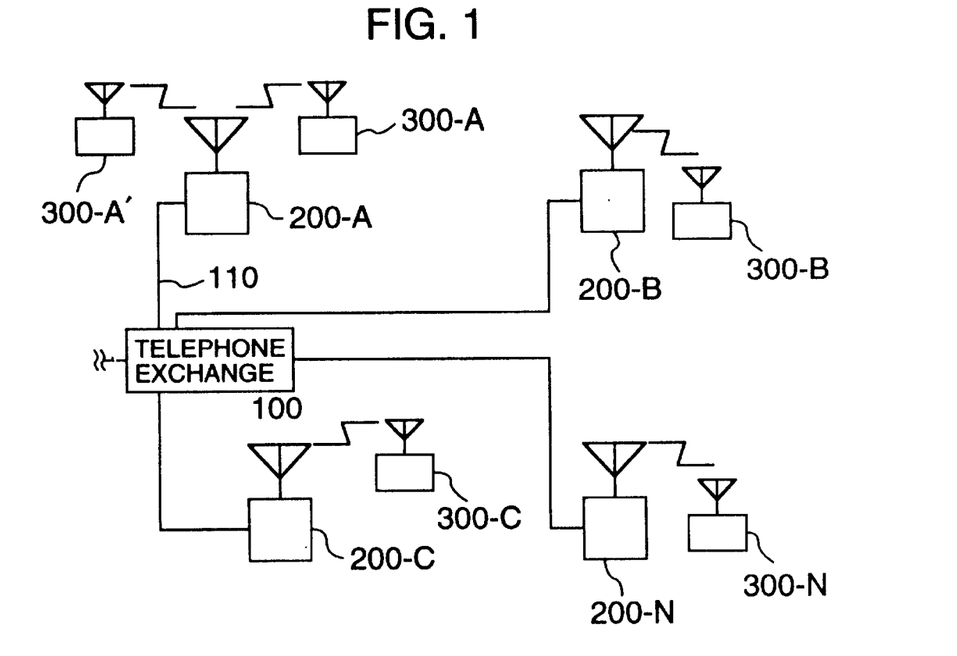
FIG. 1 is a diagram showing an example of the construction of a radio communication system according to the present invention.

FIG. 1 is a diagram showing an example of the construction of a radio communication system according to the present invention.

The radio communication system includes a plurality of base stations (BS) 200-A to 200-N connected to a telephone exchange 100 through a public switch telephone network (PSTN) 110. The base stations 200-A to 200-N communicate with mobile stations (PS) 300-A to 300-N positioned in the respective coverage areas of the base stations 200-A to 200-N by use of traffic channels selected from among a group of channels shared by the whole of the radio communication system.

An example of the radio communication system having such kind of configuration is an analog cordless telephone system. In the case of the analog cordless telephone system, each of the base stations 200-A to 200-N corresponds to a cell station (CS) installed at a home and each of mobile stations 300-A to 300-N corresponds to a personal station (PS) capable of being connected to the cell station in a one-to-one correspondence.

At the present time, an analog cordless telephone system has a total of 89 channels arranged at intervals of 12.5 KHz on a frequency axis and two of the 89 channels are "control channels" used for the transmission and reception of control information between a cell station and a personal station. The 87 remaining channels are called "traffic channels" and are used for communication between a cell station and a personal station which have completed the initial procedure of communication by the control channels.

Frequencies used as the above-mentioned traffic channels are assigned in common to all analog cordless telephone systems in Japan. One channel of a specified frequency is not fixedly assigned for each pair of cell and personal stations. When a communication is to be started between the cell and personal stations, it is required that a channel capable of obtaining a satisfactory communication quality for that communication should be selected from among the 87 channels as the traffic channels for the analog cordless telephone system without interfering with the communication between other cell and personal stations.

Figure 2:
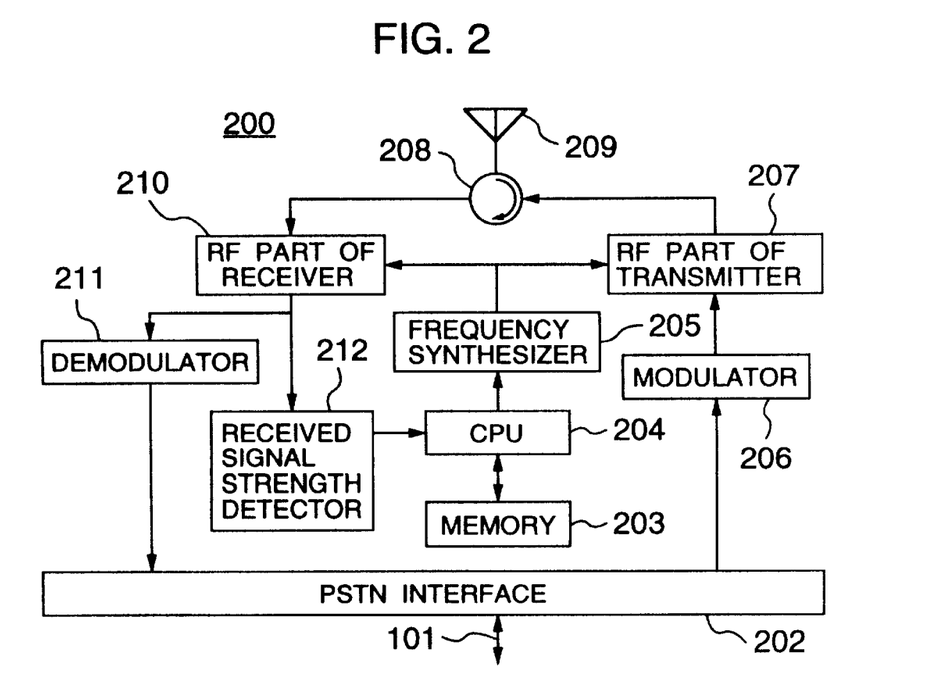
FIG. 2 is a block diagram showing an example of a base station.

FIG. 2 is a block diagram showing an example of the construction of the base station 200 in the present invention.

The base station 200-B is connected to the telephone exchange 100 through a PSTN 101 and communicates with another telephone or mobile station 300-B connected to the telephone exchange 100.

In the case where the base station 200-B communicates with the mobile station 300-B by use of a traffic channel of a radio link, a command for successively selecting channels in a channel group shared by the radio communication system is applied from a CPU 204 to a frequency synthesizer 205. The frequency synthesizer 205 supplies a frequency corresponding to each channel to an RF part 210 of a receiver in accordance with the command from the CPU 204.

A signal received from an antenna 209 is inputted to the RF receiver part 210 through a duplexer 208 and is then inputted to a received signal strength detector 212 after down-conversion thereof into a proper frequency on the basis of the output frequency of the frequency synthesizer 205. The received signal strength detector 212 detects the received signal strength level of interference wave from other base stations 200-N, etc. on each channel. Information of the received signal strength level on each channel detected by the received signal strength detector 212 is read by the CPU 204 and is then stored into a memory 203 for management.

The CPU 204 selects a candidate for traffic channel adapted to the communication with the mobile station 300-B on the basis of the received signal strength level information of each channel stored in the memory 203 and informs the mobile station 300-B of the candidate for traffic channel through the control channel. In the case where a response of permission to the communication at the traffic channel selected by the CPU 204 is obtained from the mobile station 300-B, the CPU 204 indicated the selection of the permitted traffic channel to the frequency synthesizer 205. The frequency synthesizer 205 supplies a frequency corresponding to the indicated traffic channel to an RF part 207 of a transmitter and the RF receiver part 210.

An analog signal sent from the telephone exchange 100 through the PSTN 101 in the period of communication with the mobile station 300-B is inputted to a modulator 206 through a PSTN interface 202. The modulator 206 modulates the analog signal in accordance with a modulation method adapted to radio transmission (for example, frequency modulation), and the modulated signal is supplied to the RF transmitter part 207. The modulated signal is subjected by the RF transmitter part 207 to up-conversion into a transmission frequency corresponding to the traffic channel selected by the CPU 204 and power amplification. Thereafter, the signal is passed through the duplexer 208 and is then outputted to the radio link from the antenna 209.

On the other hand, a signal from the mobile station 300-B received by the antenna 209 is inputted to the RF receiver part 210 through the duplexer 208. The received signal is down-converted by the RF receiver part 210 into a proper frequency and is thereafter supplied to a demodulator 211. The signal demodulated by the demodulator 211 is outputted through the PSTN interface 202 to the PSTN 101 for transmission to the telephone exchange 100.

Figure 3:
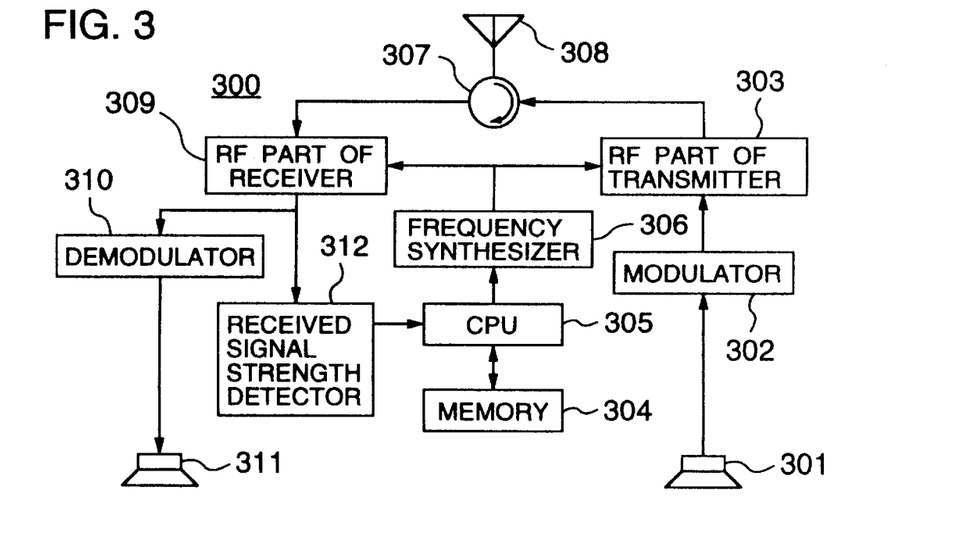
FIG. 3 is a block diagram showing an example of a mobile station.

FIG. 3 is a block diagram showing an example of the construction of the mobile station 300-B applied to the radio communication system of the present invention.

Prior to the start of communication using a traffic channel, the mobile station 300-B is informed of a candidate for traffic channel by the base station 200-B through the control channel. When a CPU 305 indicates the selection of the traffic channel of which the base station 200-B informs the mobile station 300-B, a frequency synthesizer 306 supplies a frequency corresponding to the indicated traffic channel to an RF part 309 of a receiver. Thereby, a signal from other base stations 200-N, etc. received by an antenna 308 and inputted into the RF part 309 of the receiver through a duplexer 307 is down-converted into a proper frequency and is thereafter inputted to a received signal strength detector 312 which in turn detects the received signal strength level of interference wave from the other base station 200-N, etc. on the traffic channel of which the base station 200-B informs the mobile station 300-B. The CPU 305 reads information of the received signal strength level. If the received signal strength level of interference wave is such that the communication at the traffic channel of which the base station 200-B informs the mobile station 300-B is possible, the CPU 305 informs the base station 200-B through the control channel of that effect. If the received signal strength level interferes the communication, the CPU 305 gives a response of that effect.

In the period of communication, an analog signal inputted from a microphone 301 is modulated by a modulator 302 into in accordance with a modulation method adapted to radio transmission. The modulated signal is subjected by an RF part 303 of a transmitter to up-conversion into a transmission frequency corre sponding to the traffic channel and power amplification and is thereafter outputted to the radio link through the duplexer 307 and the antenna 308.

On the other hand, a signal received by the antenna 308 is inputted to the RF part 309 of the receiver through the duplexer 307. The received signal is down-converted by the RF receiver part 210 into a proper frequency and is thereafter inputted to a demodulator 310. The signal demodulated by the demodulator 310 is outputted as voice from a speaker 311.

Figure 4:
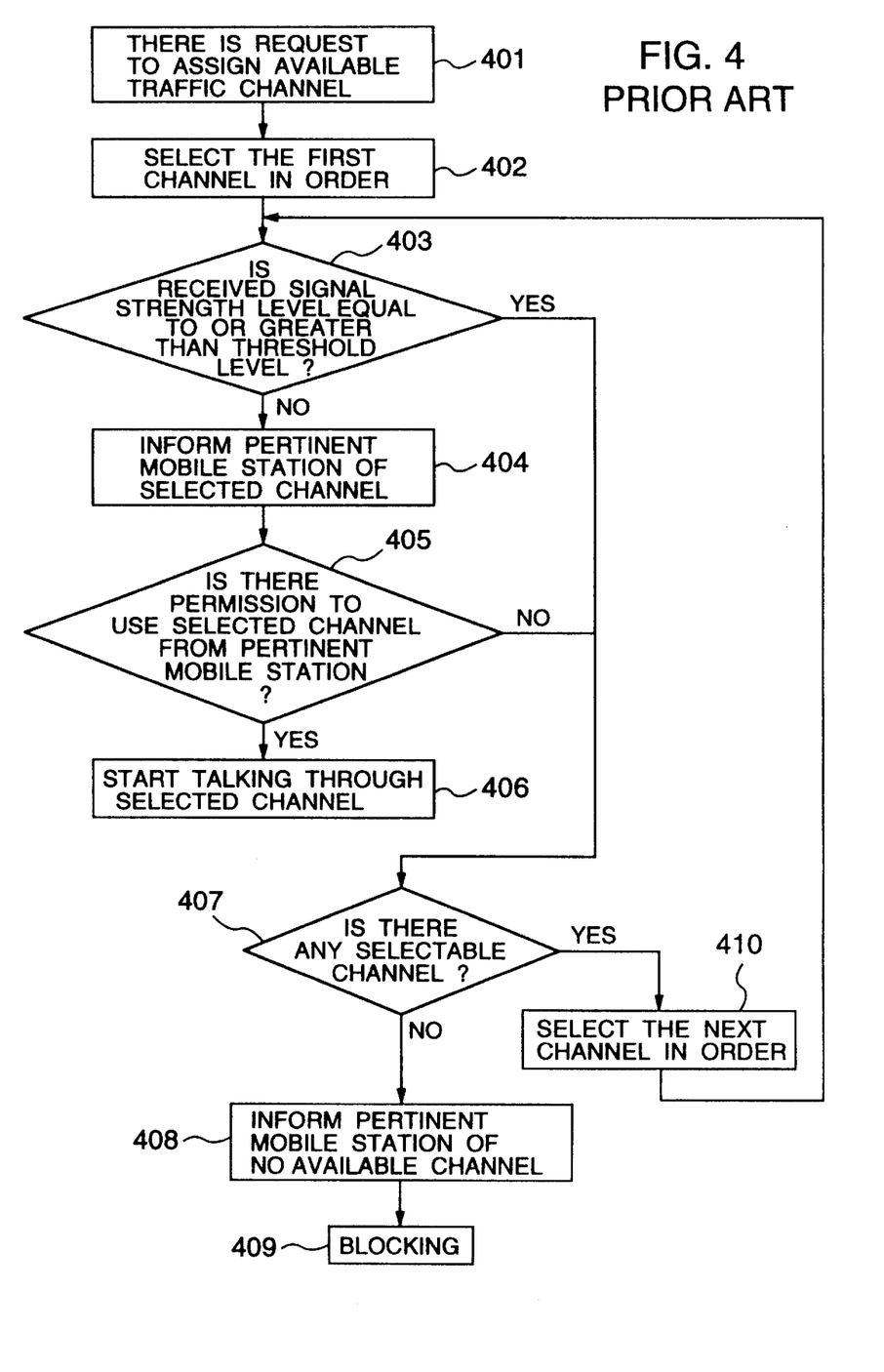
FIG. 4 is a flow chart showing an example of the conventional traffic channel assignment method.

FIG. 4 is a flow chart showing an FA (First Available) method as one example of the conventional traffic channel assignment method based on received signal strength level performed by the base station 200-B.

According to the FA method, when a call (or a request to assign an available channel) is generated (step 401), the base station 200-B selects the first channel in predetermined order (step 402) and judges whether or not the received signal strength level of interference wave from other base stations 200-N, etc. on the selected channel is equal to or greater than a specified threshold level (step 403). If the received signal strength level of interference wave is smaller than the threshold level, the base station 200-B judges the selected traffic channel as being an available channel and informs the mobile station 300-B through the control channel of this available channel as a candidate for traffic channel to be used between the base station 200-B and the mobile station 300-B (step 404). If the received signal strength level of interference wave is equal to or greater than the threshold level, the base station 200-B judges the selected channel as being a channel under use and judges whether or not there is any remaining channel which can be selected as a traffic channel (step 407). In the case where there is any remaining channel, the next channel in order is selected from among the remaining channels (step 410) and the above-mentioned judgement procedure is repeated for the selected channel. In the case where there is no remaining selectable channel, the base station 200-B informs the mobile station 300-B of no available channel (step 408) and the processing is completed in the condition of generation of blocking (step 409).

When the mobile station 300-B is informed by the base station 200-B of the candidate for traffic channel, the mobile station 300-B measures the received signal strength level of interference wave from the other base stations 200-N, etc. on this candidate for traffic channel to judge whether or not the received signal strength level is lower than the specified level and informs the base station 200-B of the result of judgement or transmits the result of judgement to the base station 200-B through the control channel. The result of judgement is transmitted as a response signal permitting the use of the candidate for assignment channel as a traffic channel in the case where the received signal strength level is smaller than the specified level and as a response signal rejecting the use of the candidate for assignment channel as a traffic channel in the case where the received signal strength level is equal to or greater than the specified level.

If the response signal from the mobile station 300-B indicates the permission to use of the candidate for assignment channel (step 405), the base station 200-B starts talking by use of the candidate for assignment channel as a traffic channel (step 406). If the response signal indicates the rejection of use, the next candidate for traffic channel is selected from among the remaining channels selectable as traffic channel (steps 407 to 410) and the above operation is repeated for the newly selected candidate for assignment channel.

Figure 5:
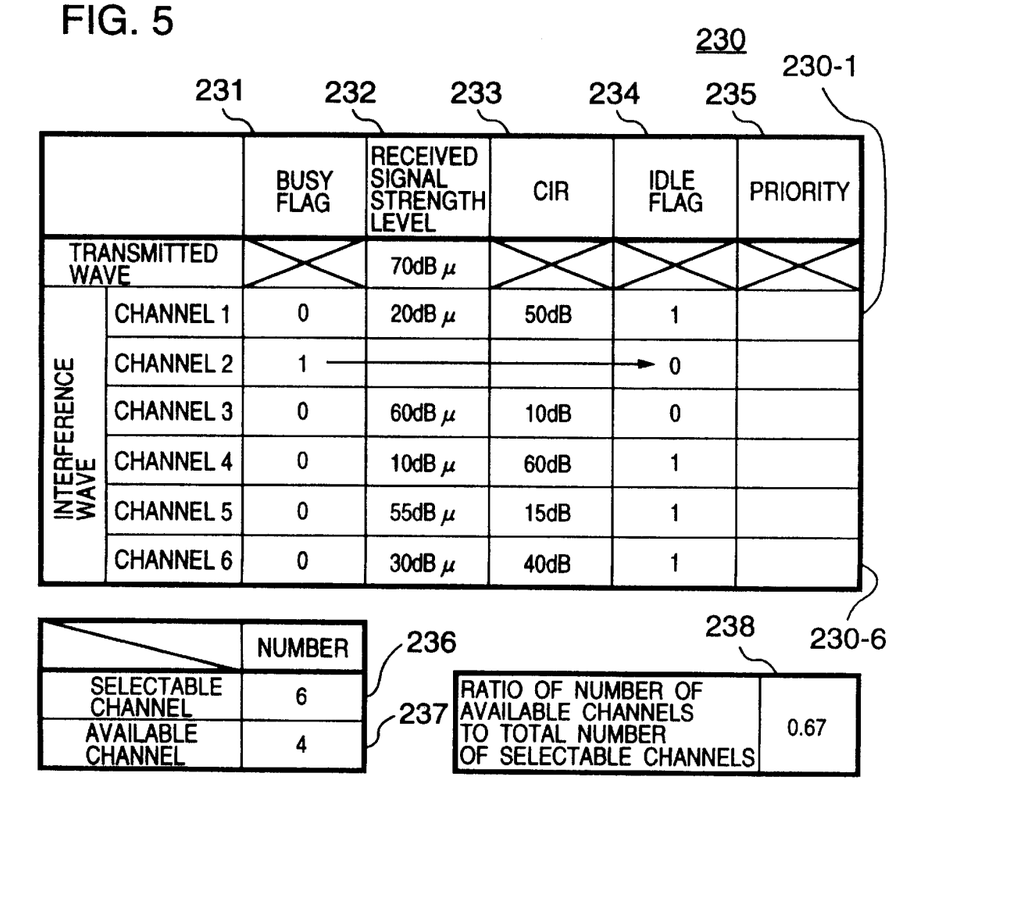
FIG. 5 is a diagram showing an example of a database provided in each base station for embodying the present invention.

FIG. 5 is a diagram showing an example of a database 230 in the base station 200 used for embodying a traffic channel assignment method according to the present invention. This database is formed in the memory 203 shown in FIG. 2.

In the shown example, the number of channels capable of being selected as traffic channels by the base station 200 is 6 (six) smaller than the actual number of channels in order to simplify the explanation of the database. The database 230 includes records 230-1 to 230-6 corresponding to channels 1 to 6. Each record is composed of a plurality of fields representing busy flag 231, received signal strength level 232, CIR 233, idle flag 234 and priority 235, respectively. The busy flag 231 indicates whether or not the corresponding channel is under use. The flag is "1" when the channel is under use and "0" when the channel is not under use.

In the case where the base station 200 has such a construction as in the existing analog cordless telephone system in which one base station uses only one channel to make the communication of transmission and reception with only one mobile station, the busy flag 231 is a useless field. In this case, the busy flag is "0" for the all records 230-1 to 230-6 in the database.

In the case where the base station 200 is the base station 200-A which includes a plurality of transducers so that the communication with separate mobile stations 300-A and 300-A is possible for the respective transducers, the busy flag 231 is useful since the same database 230 is shared for the assignment of traffic channels in the plurality of communications. For example, in the case where a call from the mobile station 300-A is generated when the base station 200-A is communicating with the mobile station 300-A with the channel 2 selected as a traffic channel, it is required that the channel 2 having already been used by the mobile station 300-A should be eliminated from candidates for traffic channels to be assigned to the mobile station 300-A' with no need of checking the received signal strength level of interference wave from other base stations 200-N, etc. on the channel 2. Therefore, the busy flag 231 of the record 230-2 corresponding to the channel 2 having assigned to another communication is set to "1". Also, the idle flag 234 of the channel 2 under use is set to "0" which indicates an engaged condition.

The received signal strength level 232 is set with the value of the received signal strength level of interference wave (in terms of dB$\mu$) detected at each channel. The CIR 233 is set with the value of subtraction of the received signal strength level value of interference wave on each channel (in terms of dB$\mu$) from the received signal strength level value of transmitted wave from the mobile station (in terms of dB$\mu$).

The idle flag 234 is set with "1" in the case where the corresponding channel is in an idle condition and "0" indicative of an engaged condition in the case where the corresponding channel is under use. For example, in the case where the CIR 233 is smaller than a predetermined threshold (for example, 12 dB) specified in the radio communication system, "0" indicative of the engaged condition is set to the idle flag 234 since the communication quality cannot be ensured. In the case where the CIR 233 is equal to or greater than the predetermined threshold, "1" indicative of the idle condition is set to the idle flag 234. The priority 235 will be mentioned later on.

In the database 230 are stored not only the records 230-1 to 230-6 but also the total number 236 of channels capable of being selected as traffic channels by the base station 200 in the radio communication system (6 in the present example) and the number 237 of available channels capable of being judged from the idle flag 234. Also, there is stored the ratio (TR) 238 of the number (CH NUM) 236 of available channels to the total number (EMPTY NUM) 237 of channels represented by the following equation:

$$TR = (EMPTY\_NUM) \div (CH\_NUM) \quad (1)$$

The ratio (TR) 238 of the number of available channels to the total number of channels has a close relationship with the traffic density of neighboring cells in the vicinity of a cell covered by each base station 200, as will be mentioned later on. Namely, as the ratio (TR) 238 is greater, the traffic density of neighboring cells is lower. As the ratio (TR) 238 is smaller, the traffic density of neighboring cells is higher.

Figure 6A:
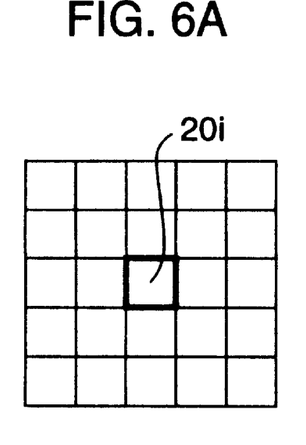
FIGS. 6A to 6C are diagrams for explaining the conditions of the traffic density of the neighborhood of a base station.
Figure 6B:
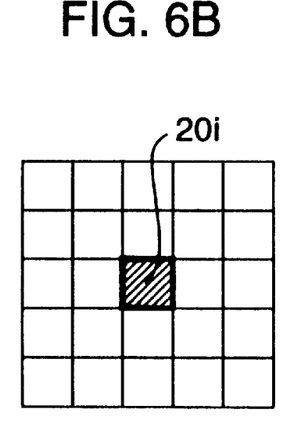
Figure 6C:
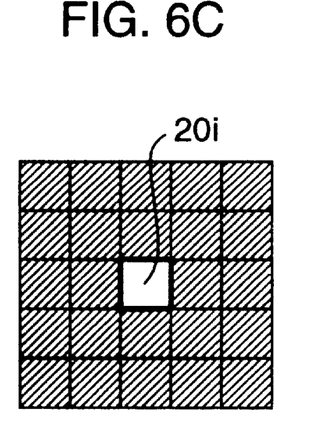

FIGS. 6A, 6B and 6C are diagrams showing the relationship in traffic density between a cell 20$i$ which is covered by one base station 200-$i$ of interest and neighboring cells which are in the vicinity of the cell 20$i$ and are covered other base stations in the vicinity of the base station 200-$i$.

FIG. 6A shows a state in which both the traffic density of the cell 20-$i$ of interest and that of the neighboring cells are low. Such a state is exhibited in a time zone such as midnight in which a human motion becomes inactive. In this state, the ratio (TR) 238 of the number of available channels to the total number of channels has a great value.

According to the present invention, in such a state in which the traffic density of neighboring cells is low, the assignment of traffic channels is made in a traffic channel assignment mode with importance attached to the communication quality. In this traffic channel assignment mode (or a mode having priority in quality), the assignment of a plurality of available channels as traffic channels is made in order of greater CIR. In this case, the efficiency of use of frequency as the whole of the radio communication system including the neighboring cells is deteriorated.

However, since the efficiency of use of the same frequency is low even in the neighborhood of the cell 20-$i$, no practical problem is generated.

FIG. 6B shows a state in which only the traffic density of the cell 20-$i$ of interest covered by the base station 200-$i$ is high and the traffic density of neighboring cells are low. In this state, the received signal strength level 232 of interference wave on the most of channels other than a channel being used in the cell 20-$i$ is generally small. Therefore, in the case where the number of channels used in the base station 200-$i$ is small as compared with the total number of channels selectable as traffic channels at each base station 200, the ratio (TR) 238 of the number of available channels to the total number of channels has a great value.

According to the present invention, in such a state in which the traffic density of neighboring cells is low, the assignment of traffic channels is made in a traffic channel assignment mode with importance attached to the communication quality, as in the case of FIG. 6A.

FIG. 6C shows a state in which the traffic density of neighboring cells are high. In this state, since the other base stations in the neighborhood of the base station 200-$i$ acquire traffic channels while avoiding channels giving a fatal damage on each communication, the ratio (TR) 238 of the number of available channels to the total number of channels has a small value.

According to the present invention, in such a state in which the traffic density of neighboring cells is high, the assignment of traffic channels is made in a traffic channel assignment mode with importance attached to the efficiency of use of frequency (or a mode having priority in capacity). In this traffic channel assignment mode, the selection from among available channels having CIR equal to or greater than a predetermined threshold value and capable of ensuring the lowest communication quality is made giving priority to a channel having a smaller CIR and a traffic channel is assigned to the selected channel. In such a situation, since traffic channels are assigned to available channels in order of smaller CIR because the traffic density of neighboring cells is high at the other base stations, there results in that the same channel is used as a traffic channel by a large number of base stations placed at a relatively short distance from each other, thereby improving the efficiency of use of frequency.

Next, a system of performing the change-over of the above-mentioned traffic channel assignment modes by a priority function will be explained as a modification of the present invention. The priority function determines the priority of an available channel as a candidate for traffic channel.

Figure 7:
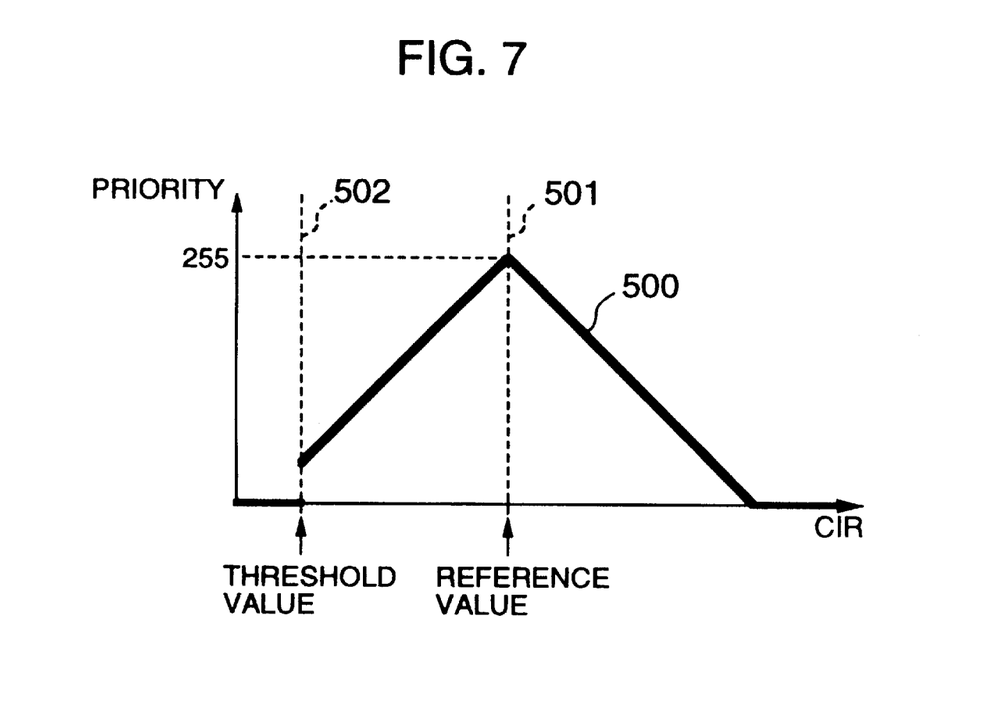
FIG. 7 is a diagram showing an example of a priority function applied to a traffic channel assignment method of the present invention.

FIG. 7 is a diagram showing an example of the priority function. A priority function 500 has a horizontal axis representing the CIR and a vertical axis representing the priority. The traffic channel assignment mode is changed by shifting a reference value 501 in accordance with the traffic density of neighboring cells.

The priority is represented by a priority function shown by, for example, the following equation:

$$PRI[n] = \begin{bmatrix} 0 & (CIR[n] < \text{threshold}) \\ 255 - |STD[TR] - CIR[n]| & \\ & (CIR[n] \geq \text{threshold}) \end{bmatrix} \quad (2)$$

The priority takes the lowest value "0" in the case where the CIR of a channel is smaller than a predetermined threshold value 502 specified in the system in order to ensure the lowest communication quality and the highest value "255" when the CIR is the reference value 501.

In equation (2), PRI[n] and CIR[n] represent the priority and the CIR of the n-th channel, respectively. A channel having the priority of "0" (PRI[n])=0) is a channel which is being used as a traffic channel at the base station or a channel which cannot ensure the lowest communication quality. This channel is outside of the object of traffic channel assignment. STD[TR] represents the reference value 501 which is changed over by the ratio (TR) of the number of available channels to the total number of channels representing the traffic density of neighboring cells. An example of STD[TR] is as follows:

$$STD[TR] = \begin{bmatrix} 80 & (TR \geq 0.4) \\ 0 & (TR < 0.4) \end{bmatrix} \quad (3)$$

According to equation (3), in the case of TR>0.4, the reference value 501 is set to "80" under the judgement of the traffic density of neighboring cells as being low. This means that in the range of CIR equal to or greater than the predetermined threshold value and equal to or smaller than 80, the priority becomes higher as the CIR becomes greater. In the case of TR<0.4, the reference value 501 is set to "0" under the judgement of the traffic density of neighboring cells as being high. This means that in the range of CIR equal to or greater than the predetermined threshold value, the priority becomes higher as the CIR becomes smaller or the priority becomes lower as the CIR becomes greater.

Figure 8:
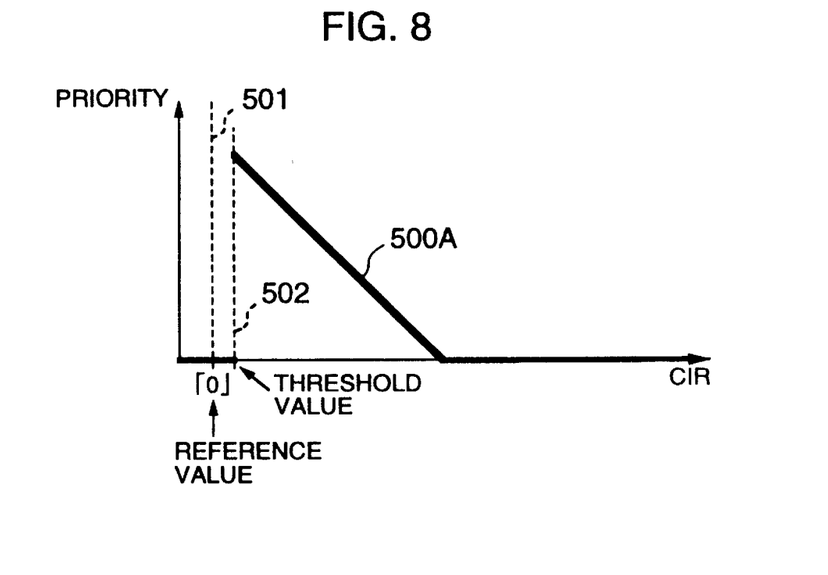
FIG. 8 is a diagram showing an example of a priority function which is applied to the traffic channel assignment method of the present invention when the traffic density is high.

FIG. 8 is a diagram showing a priority function 500A in the case where the traffic density of neighboring cells is high.

In this case, the reference value 501 is "0". For channels having CIR equal to or greater than the predetermined threshold value, the priority becomes lower as the CIR becomes greater. Accordingly, available channels become candidates for traffic channels in order of smaller CIR, that is, the assignment of traffic channels in the mode having priority in capacity is made.

Figure 9:
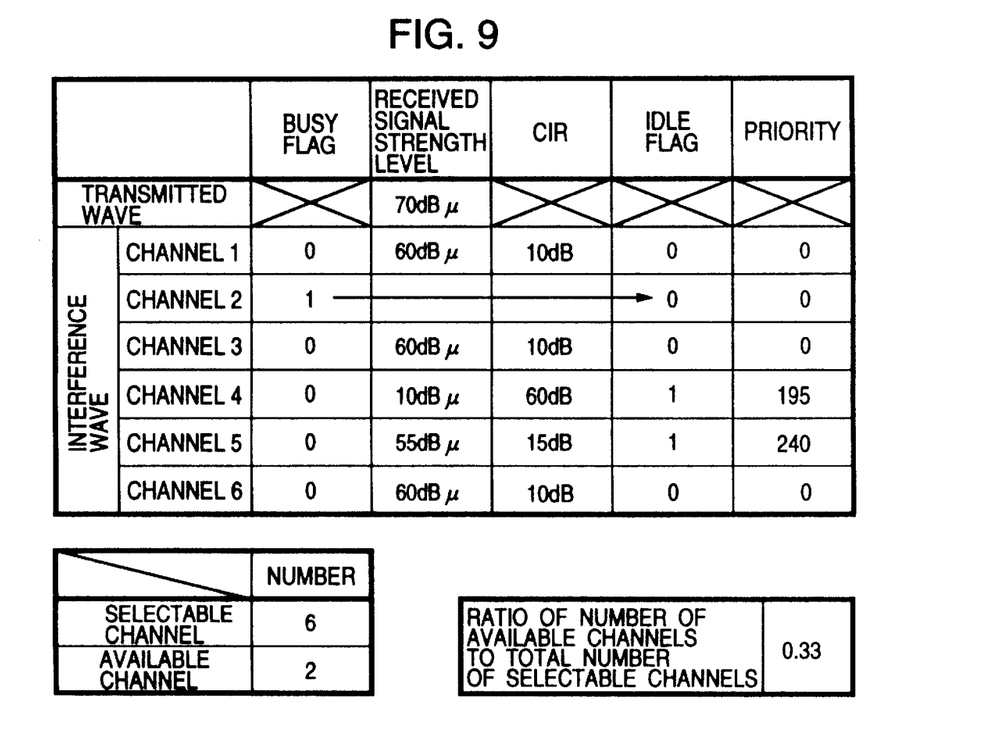
FIG. 9 is a diagram showing an example of the contents of the database of a base station when the traffic density is high.

FIG. 9 is a diagram showing an example of the database 230 in the base station 200 in the mode having priority in capacity. In the shown example, two channels 4 and 5 are available channels. The channel 5 of the two available channels 4 and 5 having a smaller CIR and a higher priority becomes the first candidate for traffic channel.

Figure 10:
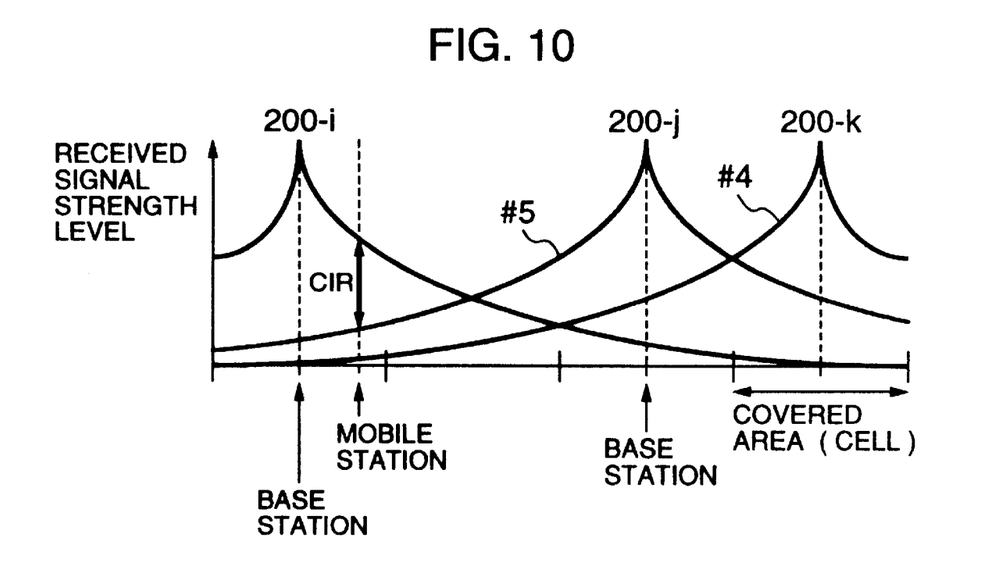
FIG. 10 is a diagram showing a relationship between a selected channel and neighboring base stations when the traffic density is high.

FIG. 10 is a diagram showing a relationship between a candidate #5 for assignment channel selected in the mode having priority in capacity and base stations sharing the candidate #5 for assignment channel. In this traffic channel assignment mode, the selection from among available channels having CIR equal to or greater than the predetermined threshold value is made giving priority to a channel having a smaller CIR. Therefore, as shown in FIG. 10, the base station 200-$i$ covering the cell 20-$i$ of interest selects the channel #5 under use by a base station 200-$j$ near to the base station 200-$i$ with priority over the channel #4 under use by a base station 200-$k$ far from the base station 200-$i$.

Figure 11:
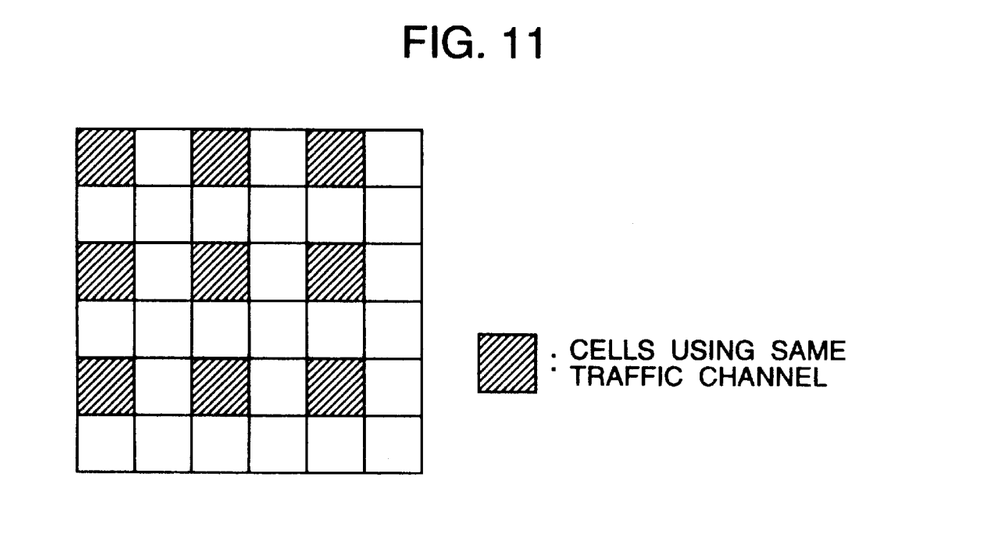
FIG. 11 is a diagram showing a relationship between the assignment of traffic channels and cells when the traffic density is high.

As a result, the channel #5 of the same frequency is commonly used by a large number of base stations at intervals of a short distance, as schematically shown in FIG. 11. Thereby, the efficiency of use of frequency is improved and it is possible to increase the number of acceptable mobile stations 300.

Figure 12:
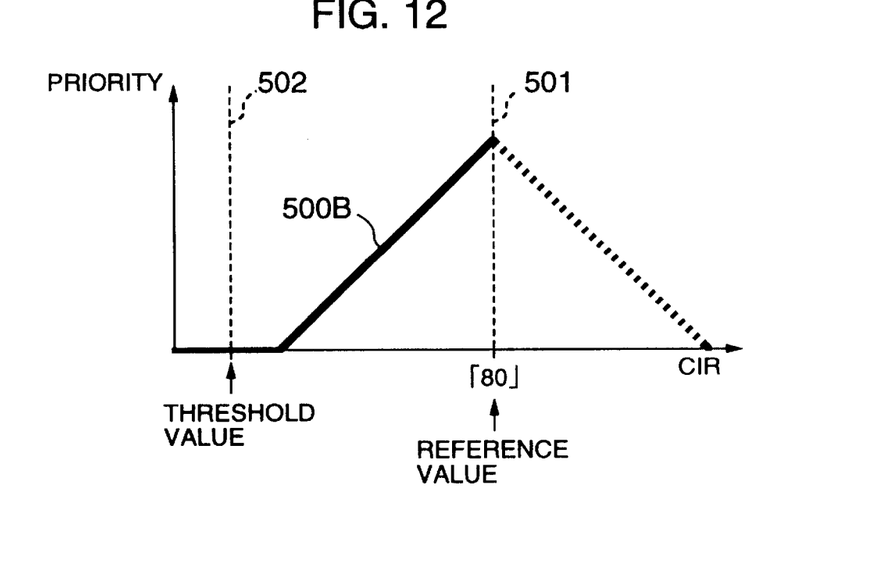
FIG. 12 is a diagram showing an example of a priority function which is applied to the traffic channel assignment method of the present invention when the traffic density is low.

FIG. 12 is a diagram showing a priority function 500B in the case where the traffic density of neighboring cells is low.

In this case, the reference value 501 is "80" and the priority becomes higher as the CIR becomes greater. Accordingly, available channels become candidates for traffic channels in order of greater CIR, that is, the assignment of traffic channels in the mode having priority in quality is made.

Figure 13:
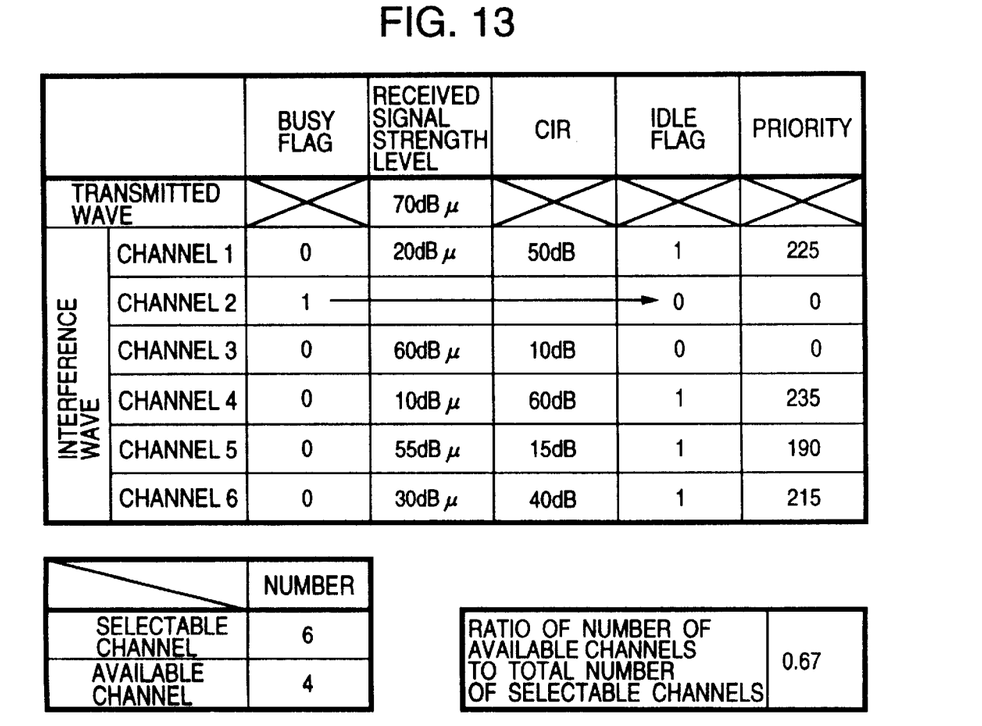
FIG. 13 is a diagram showing an example of the contents of the database of a base station when the traffic density is low.

FIG. 13 is a diagram showing an example of the database 230 in the base station in the mode having priority in quality. In the shown example, one (channel 4) of available channels 1, 4, 5 and 6 having the greatest CIR becomes the first candidate for traffic channel.

Figure 14:
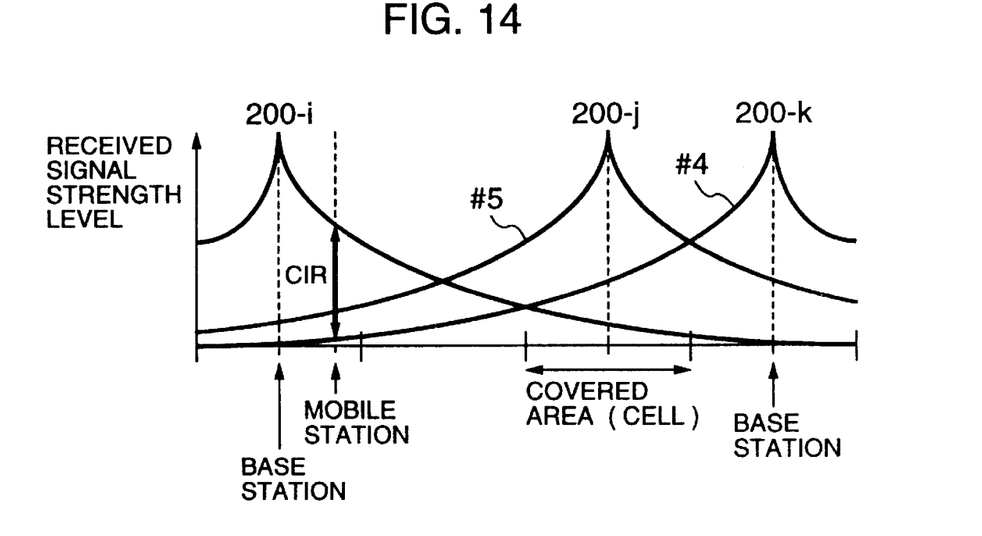
FIG. 14 is a diagram showing a relationship between a selected channel and neighboring base stations when the traffic density is low.

FIG. 14 is a diagram showing a relationship between a candidate #4 for assignment channel selected in the mode having priority in quality and base stations sharing the candidate #4 for assignment channel. In this traffic channel assignment mode, the selection from among available channels having CIR equal to or greater than the predetermined threshold value and equal to or smaller than the reference value is made giving priority as a traffic channel to a channel having a greater CIR. Therefore, as shown in FIG. 14, the base station 200-$i$ covering the cell 20-$i$ of interest selects the channel #4 under use by a base station 200-$k$ far from the base station 200-$i$ with priority over the channel #5 under use by a base station 200-$j$ near to the base station 200-$i$.

Figure 15:
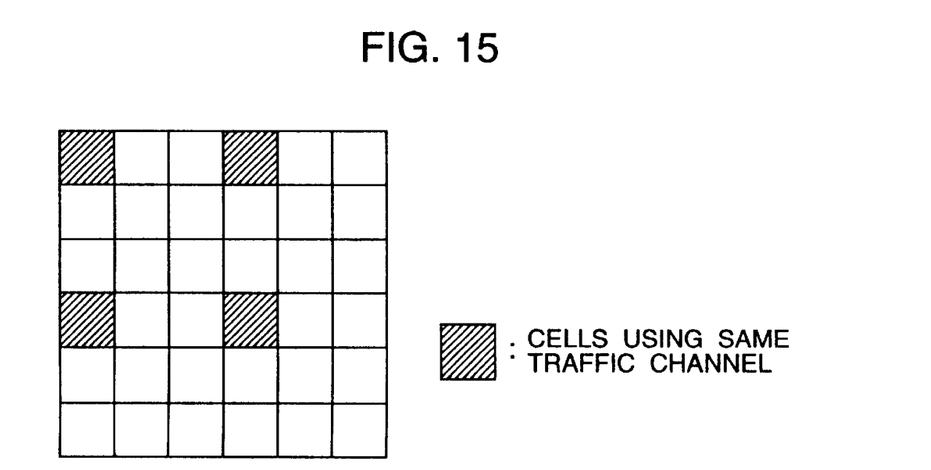
FIG. 15 is a diagram showing a relationship between the assignment of traffic channels and cells when the traffic density is low.

As a result, the channel #4 of the same frequency is shared by a small number of base stations at intervals of a long distance, as schematically shown in FIG. 15. Thereby, the efficiency of use of frequency is deteriorated but it is possible to improve the radio link quality of the traffic channel.

Figure 16:
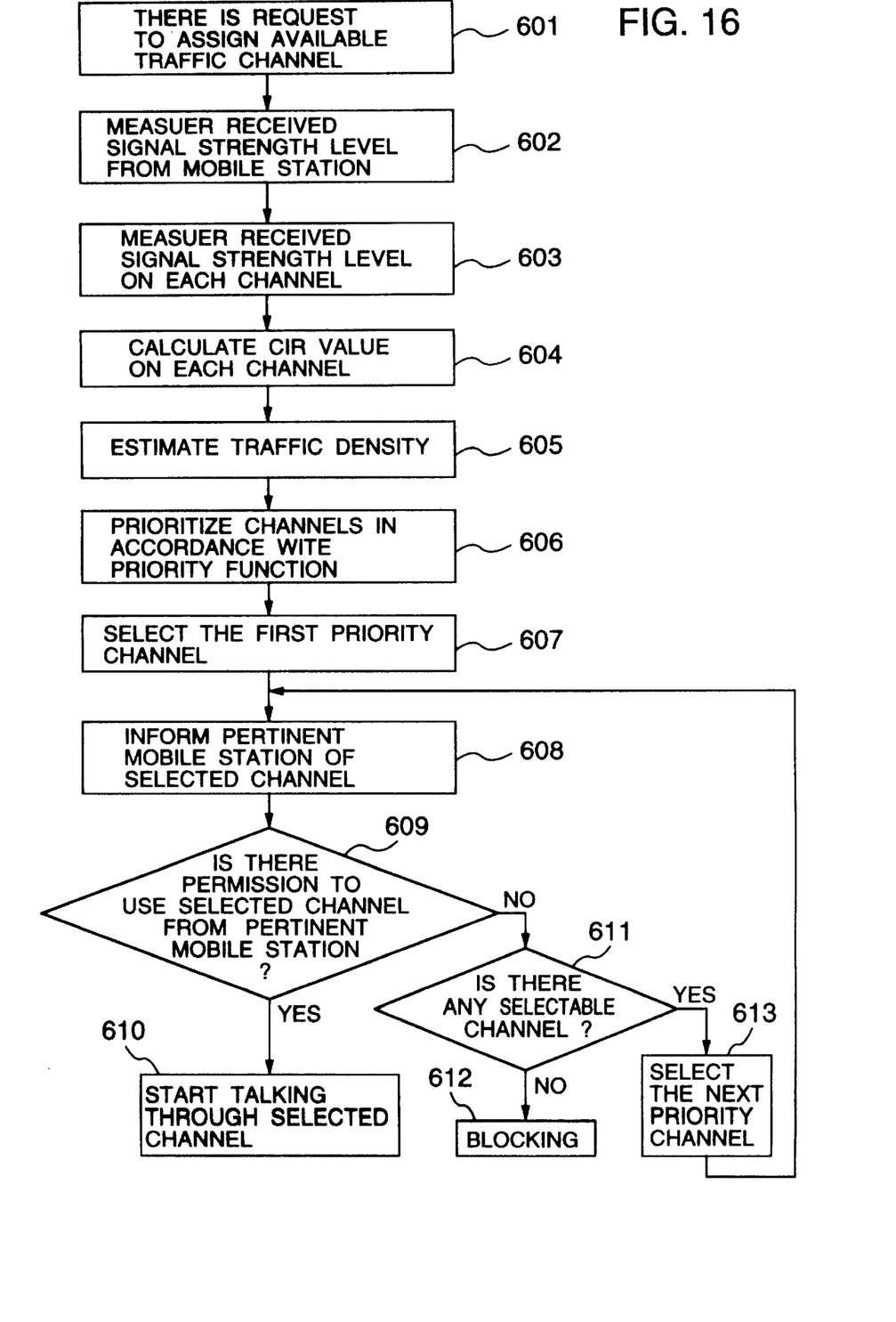
FIG. 16 is a flow chart showing an example of the traffic channel assignment method of the present invention.

FIG. 16 shows a flow chart of the above-mentioned traffic channel assignment method of the present invention in which the traffic channel assignment mode is changed over in accordance with the traffic density of neighboring cells.

In the case where there is a request for traffic channel change-over caused from interference or the like or a request for available traffic channel assignment caused from an outgoing call or an incoming call (step 601), the base station 200 measures the received signal strength level 232 of transmitted wave from the mobile station (step 602). This measurement can be conducted during the transmission and reception of control signals between the base station 200 and the mobile station 300 through control channels. Next, the received signal strength level 232 of interference wave on each channel other than a channel under use as a traffic channel is measured referring to the busy flag 231 of the database 230 (step 603). Thereafter, the CIR 233 of each channel is calculated and the calculated value is stored into the database 230 (step 604).

Next, the ratio (TR) 238 of the number of available channels to the total number of channels is estimated in order to evaluate the traffic density of neighboring cells (step 605). A traffic channel assignment mode is determined by setting the reference value (STD[TR]) of the priority function (PRI[n]) in accordance with the estimated TR value and the priority 230 of each channel is determined on the basis of the CIR value 233 on that channel (step 606). A candidate for traffic channel is selected in order of priority on the basis of the determined priority 230 (step 607) and the mobile station 300 is informed of the selected channel (step 608). Since the subsequent operation steps 609 to 613 are similar to the steps 405 to 410 of the conventional FA method explained in conjunction with FIG. 4, detailed explanation thereof will be omitted.

In the foregoing embodiment, the received signal strength level of interference wave is measured for all channels selectable as traffic channels each time a request for available traffic channel assignment is generated. However, a group of channels forming a part of available channels may be made an object of measurement of the received signal strength level of interference wave and assignment of traffic channels in order to shorten a time required for the assignment of traffic channel. The determination of the channel group to be made the object can be realized, for example, in such a manner that a group of channels having a high frequency of traffic channel assignment are extracted on the previous record at each base station and the result of extraction is identified by the database 230.

Also, there may be employed a method in which the measurement of the received signal strength level of interference wave on each channel (step 603) is periodically conducted and the CIR 233 on each channel is calculated on the basis of the received signal strength level of transmitted wave on a mobile station and the received signal strength level 232 on each channel having been measured and stored in the database 230 when a request for available traffic channel assignment is generated.

The measurement of the traffic density of neighboring cells may be conducted plural times in a fixed time to determine a traffic channel assignment mode on the basis of the average of plural measurement values.

According to the present invention, each base station autonomously judges the traffic density of neighboring cells to determine a traffic channel in a traffic channel assignment mode corresponding to the traffic density of neighboring cells. Therefore, the blocking is less even at the time of high load and a traffic channel having a high communication quality can be ensured at the time of low load.

We claim:

1. A traffic channel assignment method in a radio communication system including a base station and a mobile station, comprising:

a first step in which said base station judges the traffic density of the neighborhood of said base station from the condition of a plurality of channels selectable as traffic channels;

a second step in which said base station selects one of plural kinds of predetermined traffic channel assignment modes in accordance with said traffic density; and a third step in which said base station determines a candidate for traffic channel to be assigned to said mobile station from among available channels in accordance with the selected traffic channel assignment mode, wherein said traffic channel assignment modes include a first traffic channel assignment mode and a second traffic channel a assignment mode, the first traffic channel assignment mode giving priority to an available channel with lower communication quality than the second traffic channel assignment mode, and the first traffic channel assignment mode is selected in the second step when the traffic density is high and the second traffic channel assignment mode is selected in the second step when the traffic density is low.

2. A traffic channel assignment method according to claim 1, wherein in said first step, said base station judges said traffic density from a relationship between the total number of channels selectable as traffic channels and the number of available channels.

3. A traffic channel assignment method according to claim 2, wherein said base station measures in said first step said traffic density plural times in a fixed time and selects in said second step the traffic channel assignment mode on the basis of the average of plural measurement values.

4. A traffic channel assignment method according to claim 1, wherein in said first step, said base station judges said traffic density from the ratio of the number of available channels to the total number of channels selectable as traffic channels.

5. A traffic channel assignment method according to claim 4, wherein said base station measures in said first step said traffic density plural times in a fixed time and selects in said second step the traffic channel assignment mode on the basis of the average of plural measurement values.

6. A traffic channel assignment method according to claim 5, further comprising:

a fourth step in which said base station informs said mobile station of the candidate for traffic channel determined in accordance with the selected traffic channel assignment mode; and a fifth step in which said base station judges on the basis of a response signal from said mobile station whether said candidate for traffic channel should be used as a traffic channel or another available channel should be selected as a new candidate for traffic channel.

7. A traffic channel assignment method in a radio communication system including a base station and a mobile station, comprising:

a first step in which said base station judges the traffic density of the neighborhood of said base station from the condition of a plurality of channels selectable as traffic channels;

a second step in which said base station selects one of plural kinds of predetermined traffic channel assignment modes in accordance with said traffic density;

a third step in which said base station determines a candidate for traffic channel to be assigned to said mobile station from among available channels in accordance with the selected traffic channel assignment mode;

a fourth step in which said base station calculates a carrier to interference power ratio of each of said plurality of channels from the received signal strength level of interference wave on each of said plurality of channels and the received signal strength level of transmitted wave from said mobile station; and a fifth step in which said base station specifies as available channels those ones of said plurality of channels which have the carrier to interference power ratio equal to or greater than a predetermined threshold value for ensuring the lowest communication quality, wherein in said second step, said base station selects a first traffic channel assignment mode giving priority to an available channel with a smaller carrier to interference power ratio in the case where said traffic density is equal to or higher than a predetermined threshold value and a second traffic channel assignment mode giving priority to an available channel with a greater carrier to interference power ratio in the case where said traffic density is lower than the predetermined threshold value, and wherein in said third step, said base station determines the candidate for traffic channel to be assigned to said mobile station on the basis of the carrier to interference power ratio on each available channel in accordance with the selected first or second traffic channel assignment mode.

8. A traffic channel assignment method according to claim 7, wherein in said first step, said base station judges said traffic density from a relationship between the total number of channels selectable as traffic channels and the number of available channels.

9. A traffic channel assignment method according to claim 8, wherein said base station measures in said first step said traffic density plural times in a fixed time and selects in said second step the traffic channel assignment mode on the basis of the average of plural measurement values.

10. A traffic channel assignment method according to claim 7, wherein in said first step, said base station judges said traffic density from the ratio of the number of available channels to the total number of channels selectable as traffic channels.

11. A traffic channel assignment method according to claim 10, wherein in said second step, said base station changes over said traffic channel assignment mode in accordance with whether or not said ratio of the number of available channels to the total number of channels selectable as traffic channels is beyond a predetermined value.

12. A traffic channel assignment method according to claim 11, wherein said base station measures in said, first step said traffic density plural times in a fixed time and selects in said second step the traffic channel assignment mode on the basis of the average of plural measurement values.

13. A traffic channel assignment method according to claim 12, further comprising:
    a sixth step in which said base station informs said mobile station of the candidate for traffic channel determined in accordance with the selected traffic channel assignment mode; and
    a seventh step in which said base station judges on the basis of a response signal from said mobile station whether said candidate for traffic channel should be used as a traffic channel or another available channel should be selected as a new candidate for traffic channel.

14. A traffic channel assignment method according to claim 7, further comprising:
    a sixth step in which said base station stores a priority function defining a relationship between the carrier to interference power ratio and a priority and determines the priority of each available channel with reference made to a priority function corresponding to the selected traffic channel assignment mode,
    wherein in said third step, said base station determines one of available channels having a higher priority as the candidate for traffic channel to be assigned to said mobile station.

15. A traffic channel assignment method according to claim 14, wherein in said sixth step, said priority function defines the relationship between the carrier to interference power ratio and the priority so that the priority becomes the highest value when the carrier to interference power ratio is a certain reference value and gradually decreases as the carrier to interference power ratio is apart from said reference value and said base station obtains the priority function corresponding to the selected traffic channel assignment mode by shifting the reference value of the priority function in accordance with said traffic density.

16. A traffic channel assignment method according to claim 15, wherein in said first step, said base station judges said traffic density from a relationship between the total number of channels selectable as traffic channels and the number of available channels.

17. A traffic channel assignment method according to claim 16, wherein said base station measures in said first step said traffic density plural times in a fixed time and selects in said second step the traffic channel assignment mode on the basis of the average of plural measurement values.

18. A traffic channel assignment method according to claim 15, wherein in said first step, said base station judges said traffic density from the ratio of the number of available channels to the total number of channels selectable as traffic channels.

19. A traffic channel assignment method according to claim 18, wherein in said second step, said base station changes over said traffic channel assignment mode in accordance with whether or not said ratio of the number of available channels to the total number of channels selectable as traffic channels is beyond a predetermined value.

20. A traffic channel assignment method according to claim 19, wherein said base station measures in said first step said traffic density plural times in a fixed time and selects in said second step the traffic channel assignment mode on the basis of the average of plural measurement values.

21. A traffic channel assignment method according to claim 20, further comprising:
    a seventh step in which said base station informs said mobile station of the candidate for traffic channel determined in accordance with the selected traffic channel assignment mode; and
    an eighth step in which said base station judges on the basis of a response signal from said mobile station whether said candidate for traffic channel should be used as a traffic channel or another available channel should be selected as a new candidate for traffic channel.

22. A radio communication system comprising:
    a plurality of base stations connected to a telephone exchange; and
    a mobile station positioned in the coverage of either one of said base stations,
    wherein said base station includes first means for determining the traffic density of the neighborhood of said base station, and second means for selecting one of plural kinds of predetermined traffic channel assignment modes in accordance with said traffic density and determining a traffic channel to be assigned to said mobile station from among available channels in accordance with the selected traffic channel assignment mode,
    wherein said traffic channel assignment modes include a first traffic channel assignment mode and a second traffic channel assignment mode, the first traffic channel assignment mode giving Priority to an available channel with lower communication Quality than the second traffic channel assignment mode, and the first traffic channel assignment mode is selected When the traffic density is high and the second traffic channel assignment mode is selected when the traffic density is low.

23. A radio communication system comprising:
    a plurality of base stations connected to a telephone exchange; and
    a mobile station positioned in the coverage of either one of said base stations
    wherein said base further station includes first means for determining the traffic density of the neighborhood of said base station, and second means for selecting one of plural kinds of predetermined traffic channel assignment modes in accordance with said traffic density and determining a traffic channel to be assigned to said mobile station from among available channels in accordance with the selected traffic channel assignment mode, and third means for calculating a carrier to interference power ratio of each of a plurality of channels from the received signal strength level of interference wave on each of said plurality of channels and the received signal strength level of transmitted wave from said mobile station, wherein said second means selects a first traffic channel assignment mode giving priority to an available channel with a smaller carrier to interference power ratio in the case where said traffic density is equal to or higher than a predetermined threshold value and a second traffic channel assignment mode giving priority to an available channel with a greater carrier to interference power ratio in the case where said traffic density is lower than the predetermined threshold value and determines the candidate for traffic channel to be assigned to said mobile station on the basis of the carrier to interference power ratio on each available channel in accordance with said first or second traffic channel assignment mode selected corresponding to said traffic density.

24. A base station for performing communication with a mobile station, comprising:

first means for determining the traffic density of the neighborhood; and second means for selecting one of plural kinds of predetermined traffic channel assignment modes in accordance with said traffic density and determining a traffic channel to be assigned to said mobile station from among available channels in accordance with the selected traffic channel assignment mode, wherein said traffic channel assignment mode include a first traffic channel assignment mode and a second traffic channel assignment mode, the first traffic channel assignment mode giving priority to an available channel with lower assignment mode, and the first traffic channel assignment mode is selected and the traffic density is higher than the traffic density of the case where the second traffic channel assignment mode is selected when the traffic density is low.

25. A base station for performing communication with a mobile station comprising:

first means for determining the traffic density of the neighborhood;

second means for selecting one of plural kinds of predetermined traffic channel assignment modes n accordance with said traffic density and determining a traffic channel to be assigned to said mobile station from among available channels in accordance with the selected traffic channel assignment mode, and third means for calculating a carrier to interference power ratio (CIR) of each of a plurality of channels from the received signal strength level of interference wave on each of said plurality of channels and the received signal strength level of transmitted wave from said mobile station, wherein said second means selects a first traffic channel assignment mode giving priority to an available channel with a smaller CIR in the case where said traffic density is equal to or higher than a predetermined threshold value, and a second traffic channel assignment mode giving priority to an available channel with a greater CIR in the case where said traffic density is lower than the predetermined threshold value and determines the candidate for traffic channel to be assigned to said mobile station on the basis of the CIR on each available channel in accordance with said first or second traffic channel assignment mode selected corresponding to said traffic density.

26. A base station for performing communication with a mobile station, comprising:

a received signal strength detection unit which detects the received strength level of a plurality of channels selectable as traffic channels; and a processor which judges the traffic density of the neighborhood of said base station from said detected received strength level of channels, and selects one of plural kinds of predetermined traffic channel assignment modes in accordance with said traffic density, wherein said traffic channel assignment modes includes first traffic channel assignment mode and a second traffic channel assignment mode, and the first traffic channel assignment mode giving priority to an available channel with lower communication quality than that the second traffic channel assignment mode gives is selected in the case where the traffic density is higher than the traffic density of the case where the second traffic channel assignment mode is selected.

27. A base station according to claim 26, wherein said processor judges said traffic density from the relationship between the total number of channels selectable as traffic channels and the number of available channels.

28. A base station according to claim 27, wherein said processor calculates a carrier to interference power ratio of each plurality of channels from the received signal strength level of interference wave on each of said plurality of channels and the received signal strength level of transmitted wave from said mobile station, and specifies as available channels those ones of said plurality of channels which have the carrier to interference power ratio equal to or greater than a predetermined threshold value for ensuring the lowest communication quality.

* * * * *